United States Patent

Decottignies et al.

(10) Patent No.: US 10,618,036 B2
(45) Date of Patent: Apr. 14, 2020

(54) COBALT CATALYST BASED ON A SUPPORT CONTAINING A MIXED OXIDE PHASE CONTAINING COBALT AND/OR NICKEL PREPARED BY THE USE OF A DICARBOXYLIC ACID COMPRISING AT LEAST THREE CARBON ATOMS

(71) Applicant: IFP ENERGIES NOUVELLES, Rueil-Malmaison (FR)

(72) Inventors: Dominique Decottignies, Saint-Genis-Laval (FR); Antoine Fecant, Brignais (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/097,488

(22) PCT Filed: Mar. 20, 2017

(86) PCT No.: PCT/EP2017/056561
§ 371 (c)(1),
(2) Date: Oct. 29, 2018

(87) PCT Pub. No.: WO2017/186407
PCT Pub. Date: Nov. 2, 2017

(65) Prior Publication Data
US 2019/0143306 A1  May 16, 2019

(30) Foreign Application Priority Data
Apr. 29, 2016 (FR) ...................... 16 53851

(51) Int. Cl.
| B01J 23/75 | (2006.01) |
| B01J 37/08 | (2006.01) |
| B01J 37/02 | (2006.01) |
| B01J 21/12 | (2006.01) |
| B01J 35/10 | (2006.01) |
| C10G 2/00 | (2006.01) |
| B01J 23/89 | (2006.01) |

(52) U.S. Cl.
CPC .............. *B01J 23/75* (2013.01); *B01J 21/12* (2013.01); *B01J 23/8913* (2013.01); *B01J 35/1019* (2013.01); *B01J 35/1038* (2013.01); *B01J 35/1042* (2013.01); *B01J 37/0203* (2013.01); *B01J 37/0205* (2013.01); *B01J 37/0207* (2013.01); *B01J 37/0236* (2013.01); *B01J 37/08* (2013.01); *B01J 37/088* (2013.01); *C10G 2/332* (2013.01); *C10G 2/50* (2013.01); *Y02P 30/20* (2015.11)

(58) Field of Classification Search
CPC ........ B01J 23/75; B01J 21/12; B01J 23/8913; B01J 35/1019; B01J 35/1038; B01J 35/1042; B01J 37/0203; B01J 37/0205; B01J 37/0207; B01J 37/0236; B01J 37/08; B01J 37/088; B01J 21/005; B01J 23/005; C10G 2/332; C10G 3/00; C10G 2300/1022; C10G 2300/70; Y02P 30/20
USPC ................. 502/524, 315, 335, 337, 258–260
See application file for complete search history.

(56) References Cited

U.S. PATENT DOCUMENTS

| 5,100,857 | A | * | 3/1992 | Sato | ....................... B01J 23/755 502/335 |
| 6,369,000 | B1 | * | 4/2002 | Johnson | .................... B01J 23/02 502/439 |
| 8,143,186 | B2 | * | 3/2012 | Rytter | .................... B01J 23/755 502/259 |
| 8,461,373 | B2 | * | 6/2013 | Suzuki | .................... C07C 67/39 502/238 |
| 8,969,231 | B2 | * | 3/2015 | Rytter | ..................... B01J 23/80 502/302 |
| 2005/0026776 | A1 | | 2/2005 | Yamada | |
| 2005/0284797 | A1 | * | 12/2005 | Genetti | .................... C10G 2/32 208/115 |
| 2013/0184361 | A1 | | 7/2013 | Diehl | |
| 2019/0126253 | A1 | * | 5/2019 | Decottignies | ............ B01J 37/08 |
| 2019/0143306 | A1 | * | 5/2019 | Decottignies | ............ B01J 37/08 518/712 |

OTHER PUBLICATIONS

International Search Report PCT/EP2017/056561 dated Jun. 12, 2017. (pp. 1-13).

* cited by examiner

*Primary Examiner* — Patricia L. Hailey
(74) *Attorney, Agent, or Firm* — Millen White Zelano & Branigan, PC

(57) ABSTRACT

The invention concerns a catalyst containing an active cobalt phase deposited on a support comprising alumina, silica or silica-alumina, said support containing a mixed oxide phase containing cobalt and/or nickel, said catalyst being prepared by introducing at least one dicarboxylic acid comprising at least three carbon atoms. The invention also concerns its use in the field of Fischer-Tropsch synthesis processes.

19 Claims, No Drawings

COBALT CATALYST BASED ON A SUPPORT CONTAINING A MIXED OXIDE PHASE CONTAINING COBALT AND/OR NICKEL PREPARED BY THE USE OF A DICARBOXYLIC ACID COMPRISING AT LEAST THREE CARBON ATOMS

The invention relates to a catalyst containing an active cobalt phase deposited on a support comprising alumina, silica or silica-alumina, said support containing a mixed oxide phase containing cobalt and/or nickel, said catalyst having been prepared by introducing at least one dicarboxylic acid comprising at least three carbon atoms. The invention also relates to its preparation method and its use in the field of Fischer-Tropsch synthesis processes.

The present invention relates to the field of Fischer-Tropsch synthesis processes which can be used to obtain a wide range of hydrocarbon cuts from a CO+$H_2$ mixture, which is generally known as synthesis gas or syngas.

The simplified stoichiometric equation (limited in the equation below to the formation of alkanes) for the Fischer-Tropsch synthesis is written as follows:

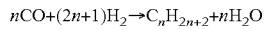

$$nCO+(2n+1)H_2 \rightarrow C_nH_{2n+2}+nH_2O$$

The catalysts used in the Fischer-Tropsch synthesis are usually supported catalysts based on alumina, silica or silica-alumina or combinations of these supports, the active phase principally being constituted by iron (Fe) or cobalt (Co), optionally doped with a noble metal such as Pt, Rh or Ru.

Adding an organic compound to Fischer-Tropsch catalysts in order to improve their activity has been recommended by the person skilled in the art.

A number of documents describe the use of various ranges of organic compounds as additives, such as organic compounds containing nitrogen and/or organic compounds containing oxygen.

In particular, the U.S. Pat. Nos. 5,856,260 and 5,856,261 respectively teach the introduction, during the preparation of the catalyst, of polyols with general formula $C_nH_{2n+2}O_x$, in which n is a whole number in the range 2 to approximately 6, and x is a whole number in the range 2 to 11 or mono- or disaccharide type sugars; sucrose is particularly preferred.

Patent application US 2005/0026776 discloses the use of chelating compounds of the nitrilotriacetic acid (NTA), trans-1,2-cyclohexadiamine-N,N,N',N' tetraacetic acid (Cy-DTA) or ethylenediaminetetraacetic acid (EDTA) type, or in fact glycine, aspartic acid or citric acid, in order to obtain a catalyst with a reduced $Co_3O_4$ crystallite size. Other documents teach the use of polyethers (WO2014/092278 and WO2015/183061), glyoxylic acid (WO2015/183059), unsaturated dicarboxylic acids (US2011/0028575) or in fact multifunctional carboxylic acids with formula HOOC—$(CRR^1)_n$—COOH in which n≥1, in the preparation of Fischer-Tropsch catalysts (WO98/47618).

The patent application US2014/0353213 describes the use of lactams or cyclic lactone type esters containing an oxygen atom in the cycle (β-propiolactone, γ-butyrolactone, δ-valerolactone) or several oxygen atoms in the cycle (propylene carbonate) in order to increase the activity of an CoMo or NiMo type catalyst used for hydrodesulphurization of a diesel type cut.

The document WO2012/013866 discloses the use of a cyclic oligosaccharide, in particular cyclodextrin, as an additive for a Fischer-Tropsch catalyst. That document also describes the use of a support based on silica-alumina optionally containing a spinel.

However, none of the documents pertaining to the additives describes a catalyst based on cobalt deposited on a support containing a mixed oxide phase containing cobalt and/or nickel prepared using a dicarboxylic acid comprising at least three carbon atoms.

Irrespective of the compounds selected, the modifications induced could not always sufficiently increase the performances of the catalyst in order to make the process profitable. In addition, deploying them on an industrial scale is often very complicated because they are complex to implement.

As a consequence, it becomes vital for the manufacturers of catalysts to discover novel catalysts for the Fischer-Tropsch synthesis which have improved performances.

SUMMARY

The invention provides a catalyst containing an active cobalt phase deposited on a support comprising alumina, silica or silica-alumina, said support containing a mixed oxide phase containing cobalt and/or nickel, said catalyst having been prepared by a process comprising at least:
  a) a step for bringing a support comprising alumina, silica or silica-alumina into contact with at least one solution containing at least one precursor of cobalt and/or nickel, then drying and calcining at a temperature in the range 700° C. to 1200° C., in a manner such as to obtain a mixed oxide phase containing cobalt and/or nickel in the support,
  then carrying out
  b) a step for bringing said support containing said mixed oxide phase into contact with at least one solution containing at least one precursor of cobalt,
  c) a step for bringing said support containing said mixed oxide phase into contact with at least one dicarboxylic acid comprising at least three carbon atoms,
  the steps b) and c) possibly being carried out separately, in any order, or simultaneously,
  d) then carrying out a drying step at a temperature of less than 200° C.

The Applicant has in fact established that the use of a dicarboxylic acid comprising at least three carbon atoms as an organic additive during the preparation of a catalyst containing an active cobalt phase deposited on a support comprising alumina, silica or silica-alumina, said support also containing a mixed oxide phase containing cobalt and/or nickel, means that a catalyst for the Fischer-Tropsch synthesis can be obtained which exhibits improved catalytic performances.

In fact, the catalyst in accordance with the invention exhibits an increased activity and selectivity compared with catalysts containing a mixed oxide phase containing cobalt and/or nickel in their support but prepared without the addition or compared with catalysts containing additives and containing no mixed oxide phase which contains cobalt and/or nickel in the support. The use of such an organic compound during the preparation of a catalyst based on cobalt containing a support containing a mixed oxide phase which contains cobalt and/or nickel appears to have a synergistic effect on the activity and selectivity in a Fischer-Tropsch process.

Without wishing to be bound by a particular theory, it has been discovered that such a catalyst has a dispersion of cobalt which is substantially superior to that exhibited by catalysts prepared in the absence of such an organic compound. It results in the presence of a larger number of active sites for the catalysts prepared in the presence of at least one dicarboxylic acid comprising at least three carbon atoms, even if that compound is subsequently eliminated at least in part by drying and optional calcining.

In a variation, the mixed oxide phase content in the support is in the range 0.1% to 50% by weight with respect to the weight of the support.

In a variation, the mixed oxide phase comprises an aluminate with formula $CoAl_2O_4$ or $NiAl_2O_4$ in the case of a support based on alumina or silica-alumina.

In a variation, the mixed oxide phase comprises a silicate with formula $Co_2SiO_4$ or $Ni_2SiO_4$ in the case of a support based on silica or silica-alumina.

In a variation, the silica content of said support is in the range 0.5% by weight to 30% by weight with respect to the weight of the support prior to the formation of the mixed oxide phase when the support is a silica-alumina.

In a variation, the dicarboxylic acid comprising at least three carbon atoms introduced during step c) is selected from an aliphatic or aromatic dicarboxylic acid.

In accordance with this variation, the dicarboxylic acid comprising at least three carbon atoms is selected from malonic acid or succinic acid.

In a variation, the molar ratio of the dicarboxylic acid comprising at least three carbon atoms introduced during step c) with respect to the elemental cobalt introduced in step b) is in the range 0.01 to 2.0 mol/mol.

In a variation, the elemental cobalt content introduced as the active phase during step b) is in the range 2% to 40% by weight, expressed as metallic elemental cobalt with respect to the total weight of the catalyst.

In a variation, the catalyst further comprises an element selected from the groups VIIIB, IA, IB, IIA, IIB, IIIA, IIIB and VA.

In a variation, the catalyst further contains an organic compound other than the dicarboxylic acid comprising at least three carbon atoms, said organic compound containing oxygen and/or nitrogen.

In a variation, the organic compound is selected from a compound comprising one or more chemical functions selected from a carboxylic, alcohol, ether, aldehyde, ketone, ester, carbonate, amine, nitrile, imide, oxime, urea and amide function.

In a variation, after the drying step d), a calcining step e) is carried out at a temperature in the range 200° C. to 550° C., in an inert atmosphere or in an atmosphere containing oxygen.

In a variation, the catalyst obtained from the drying step d) or obtained from the calcining step e) is reduced at a temperature in the range 200° C. to 500° C.

The invention also concerns the use of the catalyst in accordance with the invention in a Fischer-Tropsch synthesis process, in which the catalyst in accordance with the invention is brought into contact with a feed comprising synthesis gas at a total pressure in the range 0.1 to 15 MPa, at a temperature in the range 150° C. to 350° C., and at an hourly space velocity in the range 100 to 20000 volumes of synthesis gas per volume of catalyst and per hour, with a molar ratio $H_2/CO$ in the synthesis gas in the range 0.5 to 4.

Hereinbelow, the groups of chemical elements are given in accordance with the CAS classification (CRC Handbook of Chemistry and Physics, published by CRC Press, Editor-in-Chief D. R. Lide, 81$^{st}$ edition, 2000-2001). As an example, group VIII in the CAS classification corresponds to metals from columns 8, 9 and 10 of the new IUPAC classification.

The textural and structural properties of the support and the catalyst described hereinbelow are determined using characterization methods known to the person skilled in the art. The total pore volume and the pore distribution are determined in the present invention by nitrogen porosimetry, as described in the work "Adsorption by powders and porous solids. Principles, methodology and applications" written by F. Rouquérol, J. Rouquérol and K. Sing, Academic Press, 1999.

The term "specific surface area" means the BET specific surface area ($S_{BET}$ in m$^2$/g) determined by nitrogen adsorption in accordance with the ASTM standard D 3663-78 which was established from the BRUNAUER-EMMETT-TELLER method described in the periodical "*The Journal of American Society*", 1938, 60, 309.

DETAILED DESCRIPTION OF THE INVENTION

The catalyst in accordance with the invention is a catalyst containing an active cobalt phase deposited on a support comprising alumina, silica or silica-alumina, said support containing a mixed oxide phase containing cobalt and/or nickel, said catalyst having been prepared by a process comprising at least:

a) a step for bringing a support comprising alumina, silica or silica-alumina into contact with at least one solution containing at least one precursor of cobalt and/or nickel, then drying and calcining at a temperature in the range 700° C. to 1200° C., in a manner such as to obtain a mixed oxide phase containing cobalt and/or nickel in the support, then carrying out b) a step for bringing said support containing said mixed oxide phase into contact with at least one solution containing at least one precursor of cobalt, c) a step for bringing said support containing said mixed oxide phase into contact with at least one dicarboxylic acid comprising at least three carbon atoms, the steps b) and c) possibly being carried out separately, in any order, or simultaneously, d) then carrying out a drying step at a temperature of less than 200° C.

The various steps of the process leading to the catalyst in accordance with the invention will be described in detail below:

Step a) Formation of the Mixed Oxide Phase Containing Cobalt and/or Nickel

The aim of step a) is the formation of a mixed oxide phase containing cobalt and/or nickel in a support comprising alumina, silica or silica-alumina, by contact with a solution containing at least one precursor of cobalt and/or nickel, followed by drying and calcining at high temperature.

It is known that the presence of a mixed oxide phase containing cobalt and/or nickel in a support of the alumina, silica or silica-alumina type means that resistance to the phenomenon of chemical and mechanical attrition in a Fischer-Tropsch process can be improved, and thus the support can be stabilized.

The formation of the mixed oxide phase in the support, often termed the support stabilizing step, may be carried out using any method known to the person skilled in the art. It is generally carried out by introducing the cobalt and/or nickel in the form of a precursor of a salt, for example of the nitrate type, onto the initial support containing alumina, silica or silica-alumina. By calcining the mixed oxide phase containing cobalt and/or nickel at very high temperatures, the support as a whole is formed and stabilized. The cobalt and/or nickel contained in the mixed oxide phase cannot be reduced during final activation of the Fischer-Tropsch catalyst (reduction). The cobalt and/or nickel contained in the mixed oxide phase thus does not constitute the active phase of the catalyst.

In accordance with step a), a step is carried out for bringing a support comprising alumina, silica or silica-alumina into contact with at least one solution containing at least one precursor of cobalt and/or nickel, then drying and calcining at a temperature in the range 700° C. to 1200° C., in a manner such as to obtain a mixed oxide phase containing cobalt and/or nickel in the support.

More particularly, the contact step a) may be carried out by impregnation, preferably dry impregnation, of a support comprising alumina, silica or silica-alumina, pre-formed or as a powder, with at least one aqueous solution containing the precursor of cobalt and/or nickel, followed by drying and calcining at a temperature in the range 700° C. to 1200° C.

The cobalt is brought into contact with the support via any precursor of cobalt which is soluble in an aqueous phase. Preferably, the precursor of cobalt is introduced in aqueous solution, preferably in the form of the nitrate, carbonate, acetate, chloride, complexes formed with acetylacetonates, or any other inorganic derivative which is soluble in aqueous solution which is brought into contact with said support. The cobalt precursor which is advantageously used is cobalt nitrate or cobalt acetate.

The nickel is brought into contact with the support via any precursor of nickel which is soluble in an aqueous phase. Preferably, said precursor of nickel is introduced in aqueous solution, for example in the form of the nitrate, carbonate, acetate, chloride, hydroxide, hydroxycarbonate, oxalate, complexes formed with acetylacetonates, or any other inorganic derivative which is soluble in aqueous solution which is brought into contact with said support. The precursor of nickel which is advantageously used is nickel nitrate, nickel chloride, nickel acetate or nickel hydroxycarbonate.

The total content of cobalt and/or nickel is advantageously in the range 1% to 20% by weight and preferably in the range 2% to 10% by weight with respect to the weight of the final support.

Drying is advantageously carried out at a temperature in the range 60° C. to 200° C., preferably for a period of 30 minutes to three hours.

Calcining is carried out at a temperature in the range 700° C. to 1200° C., preferably in the range 850° C. to 1200° C., and more preferably in the range 850° C. to 900° C., generally for a period in the range from one hour to 24 hours and preferably in the range 2 hours to 5 hours. The calcining is generally carried out in an oxidizing atmosphere, for example in air, or in air depleted in oxygen; it may also be carried out at least in part under nitrogen. It can be used to transform the cobalt and/or nickel precursors and alumina and/or silica into a mixed oxide phase containing cobalt and/or nickel.

In accordance with a variation, calcining may also be carried out in two steps, said calcining advantageously being carried out at a temperature in the range 300° C. to 600° C. in air for a period in the range from half an hour to three hours, then at a temperature in the range 700° C. to 1200° C., preferably in the range 850° C. to 1200° C. and more preferably in the range 850° C. to 900° C., generally for a period in the range from one hour to 24 hours, and preferably in the range 2 hours to 5 hours.

The support comprises alumina, silica or silica-alumina.

When the support comprises alumina, it contains more than 50% by weight of alumina with respect to the weight of the support before the formation of the mixed oxide phase, and preferably it contains only alumina. The alumina may be present in a crystallographic gamma, delta, theta, or alpha form, alone or as a mixture.

In another preferred case, the support comprises silica. In this case, it contains more than 50% by weight of silica with respect to the weight of the support before the formation of the mixed oxide phase, and preferably it contains silica alone. The sources of silica are well known to the person skilled in the art.

In another preferred case, the support comprises a silica-alumina. The term "support comprising a silica-alumina" means a support in which the silicon and aluminium are in the form of agglomerates of silica or alumina respectively, amorphous aluminosilicate or any other mixed phase containing silicon and aluminium, it being understood that the support is not mesostructured. Preferably, the alumina and the silica are present in the form of a mixture of $SiO_2$ and $Al_2O_3$ oxides. The silica content in the silica-alumina support varies from 0.5% by weight to 30% by weight, preferably from 1% by weight to 25% by weight, and more preferably from 1.5% to 20% by weight with respect to the weight of the support before the formation of the mixed oxide phase.

In accordance with a preferred variation, the support is constituted by alumina, silica or silica-alumina, and particularly preferably the support is constituted by silica-alumina.

The support also contains a mixed oxide phase containing cobalt and/or nickel. The term "mixed oxide phase containing cobalt and/or nickel" should be understood to mean a phase in which cobalt and/or nickel cations are combined with oxide ions $O^{2-}$ of the alumina and/or silica support, thereby forming a mixed phase containing aluminates and/or silicates containing cobalt and/or nickel. The mixed oxide phase may be in the amorphous form or in the crystalline form.

When the support is based on alumina, the mixed oxide phase may comprise an aluminate with formula $CoAl_2O_4$ or $NiAl_2O_4$, in the amorphous or crystalline form, for example in the form of spinel.

When the support is based on silica, the mixed oxide phase may comprise a silicate with formula $Co_2SiO_4$ or $Ni_2SiO_4$ (cobalt or nickel orthosilicate), in the amorphous or crystalline form.

When the support is based on silica-alumina, the mixed oxide phase may comprise an aluminate with formula $CoAl_2O_4$ or $NiAl_2O_4$ in the amorphous or crystalline form, for example in the form of spinel, and/or a silicate with formula $Co_2SiO_4$ or $Ni_2SiO_4$, in the amorphous or crystalline form.

In general, the content of the mixed oxide phase in the support is in the range 0.1% to 50% by weight with respect to the weight of the support, preferably in the range 0.5% to 30% by weight, and more preferably in the range 1% to 20% by weight.

The presence of a mixed oxide phase in the catalyst in accordance with the invention is measured by temperature programmed reduction (TPR) as described, for example, in *Oil & Gas Science and Technology, Rev. IFP*, Vol. 64 (2009), No. 1, pp. 11-12. In that technique, the catalyst is heated in a stream of a reducing agent, for example in a stream of dihydrogen. The measurement of the dihydrogen consumed as a function of the temperature provides quantitative information regarding the reducibility of the species present. The presence of a mixed oxide phase in the catalyst is then demonstrated by a consumption of dihydrogen at a temperature of more than approximately 800° C.

The support may have a morphology in the form of beads, extrudates (for example in the form of trilobes or quadrilobes) or pellets, in particular when said catalyst is employed in a reactor functioning in fixed bed mode, or it may have a powder type morphology with a variable granulometry, in particular when said catalyst is employed in a reactor of the slurry bubble column type. The grain size of the catalyst may be in the range from a few microns to a few hundred microns. When operating in a slurry type reactor, the grain size of the catalyst is preferably in the range 10 microns to 500 microns, preferably in the range 10 microns to 300 microns, highly preferably in the range 20 to 200 microns, and yet more preferably in the range 30 to 160 microns.

The specific surface area of the support containing the mixed oxide phase is generally in the range 50 m$^2$/g to 500 m$^2$/g, preferably in the range 100 m$^2$/g to 300 m$^2$/g, more preferably in the range 150 m$^2$/g to 250$^2$/g. The pore volume of said support is generally in the range 0.3 mL/g to 1.2 mL/g, and preferably in the range 0.4 mL/g to 1 mL/g.

Thus, at the end of said step a), said support comprising alumina, silica or silica-alumina further comprises a mixed oxide phase containing cobalt and/or nickel.

Step b) and c): Introduction of the Active Phase and of the Dicarboxylic Acid Comprising at Least Three Carbon Atoms Following the formation of the mixed oxide phase, the following steps are carried out in the preparation of the catalyst in accordance with the invention:
b) a step for bringing said support containing said mixed oxide phase into contact with at least one solution containing at least one precursor of cobalt,
c) a step for bringing said support containing said mixed oxide phase into contact with at least one dicarboxylic acid comprising at least three carbon atoms,
the steps b) and c) possibly being carried out separately, in any order, or simultaneously.

Step b) for bringing said support into contact with at least one solution containing at least one precursor of cobalt may be carried out using any method which is well known to the person skilled in the art. Said step b) is preferably carried out by impregnation of the support with at least one solution containing at least one precursor of cobalt. In particular, said step b) may be carried out by dry impregnation, by excess impregnation, or by deposition—precipitation (as described in U.S. Pat. Nos. 5,874,381 and 6,534,436) in accordance with methods which are well known to the person skilled in the art. Preferably, said step b) is carried out by dry impregnation, which consists of bringing the catalyst support into contact with a solution containing at least one precursor of cobalt, the volume of which is equal to the pore volume of the support to be impregnated. This solution contains the cobalt precursor at the desired concentration.

The cobalt is brought into contact with said support by means of any precursor of cobalt which is soluble in an aqueous phase or in an organic phase. When it is introduced in organic solution, said precursor of cobalt is cobalt acetate, for example. Preferably, said precursor of cobalt is introduced in aqueous solution, for example in the form of the nitrate, carbonate, acetate, chloride, complexes formed with acetylacetonates, or any other inorganic derivative which is soluble in aqueous solution, which is brought into contact with said support. Advantageously, cobalt nitrate or cobalt acetate is used as the precursor of cobalt.

The cobalt element content is in the range 2% to 40% by weight, preferably in the range 5% to 30% by weight, and more preferably in the range 10% to 25% by weight, expressed as the metallic cobalt element with respect to the total weight of the catalyst.

The catalyst may advantageously further comprise at least one element selected from an element from groups VIIIB, IA, IB, IIA, IIB, IIIA, IIIB and/or VA.

Preferred optional elements from group VIIIB are platinum, ruthenium and rhodium. The preferred elements from group IA are sodium and potassium. The preferred elements from group IB are silver and gold. The preferred elements from group IIA are manganese and calcium. The preferred element from group IIB is zinc. The preferred elements from group IIIA are boron and indium. The preferred elements from group IIIB are lanthanum and cerium. The preferred element from group VI is phosphorus.

The content of the optional element from groups VIIIB, IA, IB, IIA, IIB, IIIA, IIIB and/or VA is in the range 50 ppm to 20% by weight, preferably in the range 100 ppm to 15% by weight, and more preferably in the range 100 ppm to 10% by weight, expressed as the element with respect to the total weight of the catalyst.

In a variation, when the catalyst contains one or more supplemental elements from groups VIIIB, IA, IB, IIA, IIB, IIIA, IIIB and/or VA, this element or these elements may either be initially present on the support before the preparation of the catalyst, or are introduced at any moment during the preparation and by using any of the methods known to the person skilled in the art.

Contact of the organic compound employed in order to carry out said step c) with said support is carried out by impregnation, in particular by dry impregnation or excess impregnation, preferably by dry impregnation. Said organic compound is preferably impregnated onto said support after dissolving it in aqueous solution.

Said dicarboxylic acid comprising at least three carbon atoms may be selected from aliphatic or aromatic dicarboxylic acids.

In the case of aliphatic dicarboxylic acids, the compound may be a saturated dicarboxylic acid such as malonic acid, succinic acid or glutaric acid, or an unsaturated dicarboxylic acid such as maleic acid or fumaric acid. Preferably, the aliphatic dicarboxylic acid is a saturated dicarboxylic acid.

In the case of aromatic dicarboxylic acids, the compound may be phthalic acid, isophthalic acid or terephthalic acid.

The molar ratio of the dicarboxylic acid comprising at least three carbon atoms introduced during step c) with respect to the elemental cobalt introduced in step b) is in the range 0.01 to 2.0 mol/mol, preferably in the range 0.05 to 1.0.

In addition to the dicarboxylic acid comprising at least three carbon atoms, the catalyst in accordance with the invention may comprise another organic compound or a group of organic compounds which are known to act as additives. The function of additives is to increase the catalytic activity compared with catalysts without additives. More particularly, the catalyst in accordance with the invention may also comprise one or more organic compounds containing oxygen and/or nitrogen.

In general, the organic compound is selected from a compound comprising one or more chemical functions selected from a carboxylic, alcohol, ether, aldehyde, ketone, ester, carbonate, amine, nitrile, imide, oxime, urea and amide function.

The organic compound containing oxygen may be one or more selected from compounds comprising one or more chemical functions selected from a carboxylic, alcohol, ether, aldehyde, ketone, ester or carbonate function. By way of example, the organic compound containing oxygen may be one or more selected from the group constituted by ethyleneglycol, diethyleneglycol, triethyleneglycol, a polyethyleneglycol (with a molecular weight in the range 200 to 1500 g/mol), propyleneglycol, 2-butoxyethanol, 2-(2-butoxyethoxy)ethanol, 2-(2-methoxyethoxy)ethanol, triethyleneglycol dimethylether, glycerol, acetophenone, 2,4-pentanedione, pentanone, acetic acid, malic acid, oxalic acid, gluconic acid, tartaric acid, citric acid, succinic acid, γ-ketovaleric acid, γ-valerolactone, 4-hydroxyvaleric acid, 2-pentenoic acid, 3-pentenoic acid, 4-pentenoic acid, a C1-C4 dialkyl succinate, methyl acetoacetate, dibenzofuran, a crown ether, orthophthalic acid, glucose and propylene carbonate.

The organic compound containing nitrogen may be one or more selected from compounds comprising one or more chemical functions selected from an amine or nitrile function. By way of example, the organic compound containing nitrogen may be one or more selected from the group constituted by ethylenediamine, diethylenetriamine, hexamethylenediamine, triethylenetetramine, tetraethylenepentamine, pentaethylenehexamine, acetonitrile, octylamine, guanidine or a carbazole.

The organic compound containing oxygen and nitrogen may be one or more selected from compounds comprising one or more chemical functions selected from a carboxylic, alcohol, ether, aldehyde, ketone, ester, carbonate, amine, nitrile, imide, oxime, urea and amide function. By way of example, the organic compound containing oxygen and nitrogen may be one or more selected from the group constituted by 1,2-cyclohexanediaminetetraacetic acid, monoethanolamine (MEA), N-methylpyrrolidone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylene-triaminepentaacetic acid (DTPA), tetramethylurea, glutamic acid, dimethylglyoxime, bicine or tricine, or indeed a lactam.

The total molar ratio of organic compound(s) containing oxygen and/or nitrogen other than the dicarboxylic acid comprising at least three carbon atoms with respect to the elemental cobalt introduced in step b) is in the range 0.01 to 2 mol/mol, preferably in the range 0.1 to 2 mol/mol, more preferably in the range 0.2 to 1.5 mol/mol, calculated on the basis of the components introduced into the impregnation solution(s).

When the catalyst further contains an organic compound other than the dicarboxylic acid comprising at least three carbon atoms, this organic compound may either be initially present on the support before the preparation of the catalyst, or incorporated into the catalyst at any time during the preparation and using any of the methods known to the person skilled in the art.

Carrying Out Steps b) and c)

The process for the preparation of the catalyst in accordance with the invention, in particular steps b) and c), comprises several embodiments. They are in particular distinguished by the time at which the organic compound is introduced; it may be either at the same time as the impregnation of the cobalt of the active phase (co-impregnation), or after impregnation of the cobalt of the active phase (post-impregnation), or before impregnation of the cobalt of the active phase (pre-impregnation). In addition, the embodiments may be combined.

A first embodiment consists of carrying out said steps b) and c) simultaneously in a manner such that said organic compound and at least said cobalt precursor present in the active phase are co-impregnated onto said support (co-impregnation). Said first embodiment advantageously comprises carrying out one or more steps b). In particular, one or more steps b) advantageously precede and/or follow said co-impregnation step. Said first embodiment may comprise several co-impregnation steps.

A second embodiment consists of carrying out said step b) prior to said step c) (post-impregnation). In accordance with said second embodiment, one or more steps b) for contact of at least cobalt present in the active phase of the catalyst precede(s) said step c).

A third embodiment consists of carrying out said step c) prior to said step b) (pre-impregnation). Advantageously, said step c) is followed by several steps b).

When the steps b) and c) are carried out separately (post-impregnation or pre-impregnation), a drying step is advantageously carried out between the impregnation steps. The intermediate drying step is carried out at a temperature of less than 200° C., advantageously in the range 50° C. to 180° C., preferably in the range 70° C. to 150° C., more preferably in the range 75° C. to 130° C., and optionally, a maturation period is carried out between the impregnation step and the intermediate drying step.

Each of the three embodiments described above may be carried out independently in a manner such that the catalyst in accordance with the invention is prepared either in accordance with said first embodiment, or in accordance with said second embodiment, or in fact in accordance with said third embodiment. However, it may be advantageous to combine said first embodiment with said second embodiment or with said third embodiment: deposition of the cobalt present in the active phase as well as the organic compound onto the catalyst support is carried out at least twice, namely at least once by co-impregnation and at least once by successive impregnation.

Advantageously, after each impregnation step, irrespective of whether it is a step for the impregnation of cobalt or organic compound, the impregnated support is allowed to mature. Maturation can allow the impregnation solution to become homogeneously dispersed within the support.

Any maturation step described in the present invention is advantageously carried out at atmospheric pressure, in an atmosphere saturated with water and at a temperature in the range 17° C. to 50° C., and preferably at ambient temperature. Generally, a maturation period in the range from ten minutes to forty-eight hours and preferably in the range from thirty minutes to five hours is sufficient. Longer periods are not excluded, but do not necessary provide any improvement.

Any impregnation solution described in the present invention may include any polar solvent known to the person skilled in the art. Said polar solvent used is advantageously selected from the group formed by methanol, ethanol, water, phenol and cyclohexanol, used alone or as a mixture. Said polar solvent may also be selected from the group formed by propylene carbonate, DMSO (dimethylsulphoxide), N-methylpyrrolidone (NMP) or sulpholane, used alone or as a mixture. Preferably, a polar protic solvent is used. A list of the usual polar solvents as well as their dielectric constants can be found in the book "Solvents and Solvent Effects in Organic Chemistry" C. Reichardt, Wiley-VCH, third edition, 2003, pages 472-474. Highly preferably, the solvent used is water or ethanol, and particularly preferably, the solvent is water. In one possible embodiment, the solvent may be absent from the impregnation solution.

When several impregnation steps are carried out, each impregnation step is preferably followed by an intermediate drying step at a temperature of less than 200° C., advantageously in the range 50° C. to 180° C., preferably in the range 70° C. to 150° C., highly preferably in the range 75°

C. to 130° C., and optionally, a maturation period is carried out between the impregnation step and the intermediate drying step.

Drying Step d)

In accordance with the drying step d) when carrying out the preparation of the catalyst prepared in accordance with at least one embodiment as described above, drying is carried out at a temperature of less than 200° C., advantageously in the range 50° C. to 180° C., preferably in the range 70° C. to 150° C., highly preferably in the range 75° C. to 130° C. The drying step is preferably carried out over a period in the range 1 to 4 hours, preferably in an inert atmosphere or in an atmosphere containing oxygen.

The drying step may be carried out using any technique which is known to the person skilled in the art. It is advantageously carried out at atmospheric pressure or under reduced pressure.

Preferably, this step is carried out at atmospheric pressure. It is advantageously carried out in a flushed bed using air or any other hot gas. Preferably, when drying is carried out in a fixed bed, the gas used is either air or an inert gas such as argon or nitrogen. Highly preferably, drying is carried out in a flushed bed in the presence of nitrogen and/or air. Preferably, the drying step is of a short duration in the range 5 minutes to 4 hours, preferably in the range 30 minutes to 4 hours and highly preferably in the range 1 hour to 3 hours.

In accordance with a first variation, drying is preferably carried out in a manner such as to preserve at least 30% of the dicarboxylic acid comprising at least three carbon atoms introduced during an impregnation step; preferably, this quantity is more than 50% and more preferably, more than 70%, calculated on the basis of the carbon remaining on the catalyst. When an organic compound containing oxygen and/or nitrogen other than the dicarboxylic acid comprising at least three carbon atoms is present, the drying step is preferably carried out in a manner such as to preserve at least 30%, preferably at least 50%, and highly preferably at least 70% of the quantity introduced, calculated on the basis of the carbon remaining on the catalyst.

At the end of the drying step d), a dried catalyst is thus obtained which will undergo an activation step so that it can subsequently be used in the Fischer-Tropsch synthesis.

In accordance with another variation, at the end of the drying step d), a calcining step e) is carried out at a temperature in the range 200° C. to 550° C., preferably in the range 250° C. to 500° C., in an inert atmosphere (for example nitrogen), or in an atmosphere containing oxygen (for example air). The duration of this heat treatment is generally in the range 0.5 hours to 16 hours, preferably in the range 1 hour to 5 hours. After this treatment, the cobalt of the active phase is then in the oxide form and the catalyst contains no more or very little of the organic compound introduced during its synthesis. However, introducing the organic compound during its preparation has allowed the dispersion of the active phase to be increased, thereby resulting in a more active and/or more selective catalyst.

Activation (Reduction)

Prior to using it in the catalytic reactor and carrying out the Fischer-Tropsch process in accordance with the invention, the dried catalyst obtained in step d) or the calcined catalyst obtained in step e) advantageously undergoes a reduction treatment, for example with hydrogen, pure or diluted, at high temperature. This treatment can be used to activate said catalyst and form particles of metallic cobalt in a zero-valent state. The temperature of this reduction treatment is preferably in the range 200° C. to 500° C., and its duration is in the range 2 to 20 hours.

This reduction treatment is carried out either in situ (in the same reactor as that in which the Fischer-Tropsch reaction in accordance with the process of the invention is operated), or ex situ before being charged into the reactor.

Fischer-Tropsch Process

Finally, another aim of the invention is the use of the catalyst in accordance with the invention in a Fischer-Tropsch synthesis process.

The Fischer-Tropsch process in accordance with the invention results in the production of essentially linear and saturated C5+ hydrocarbons (containing at least 5 carbon atoms per molecule). The hydrocarbons produced by the process of the invention are thus essentially paraffinic hydrocarbons, wherein the fraction with the highest boiling points may be converted into middle distillates (gas oil cuts and kerosene) with a high yield, by a hydroconversion process such as catalytic hydrocracking and/or hydroisomerization.

The feed used to carry out the process of the invention comprises synthesis gas. Synthesis gas is a mixture primarily comprising carbon monoxide and hydrogen with $H_2/CO$ molar ratios which can vary between a ratio of 0.5 and 4 depending on the process via which it has been obtained. The $H_2/CO$ molar ratio of synthesis gas is generally close to 3 when the synthesis gas is obtained from a process for steam reforming hydrocarbons or alcohol. The $H_2/CO$ molar ratio of synthesis gas is of the order of 1.5 to 2 when the synthesis gas is obtained from a partial oxidation process. The $H_2/CO$ molar ratio of synthesis gas is generally close to 2.5 when it is obtained from a thermal reforming process. The $H_2/CO$ molar ratio of synthesis gas is generally close to 1 when it is obtained from a process for gasification and reforming of $CO_2$.

The catalyst used in the process for the synthesis of hydrocarbons in accordance with the invention may be deployed in various types of reactors, for example in a fixed bed, in a moving bed, in an ebullated bed, or in fact in a three-phase fluidized bed. The use of a catalyst in suspension in a three-phase fluidized bed, preferably of a bubble column type, is preferred. In this preferred embodiment of the catalyst, said catalyst is divided into a very fine powder, particularly of the order of a few tens of microns; this powder forms a suspension with the reaction medium. This technology is also known to the person skilled in the art by the terminology "slurry" process.

The hydrocarbon synthesis process in accordance with the invention is operated at a total pressure in the range 0.1 to 15 MPa, preferably in the range 0.5 to 10 MPa, at a temperature in the range 150° C. to 350° C., preferably in the range 180° C. to 270° C. The hourly space velocity is advantageously in the range 100 to 20000 volumes of synthesis gas per volume of catalyst per hour (100 to 20000 $h^{-1}$) and preferably in the range 400 to 10000 volumes of synthesis gas per volume of catalyst and per hour (400 to 10000 $h^{-1}$).

The following examples demonstrate the gains in performances for the catalysts in accordance with the invention.

EXAMPLES

Example 1 (Comparative): Catalyst a with Formula $Co/Al_2O_3$

A catalyst A comprising cobalt deposited on an alumina support was prepared by dry impregnation of an aqueous solution of cobalt nitrate in order to deposit of the order of 10% by weight of Co in two successive steps onto a gamma alumina powder (PURALOX® SCCa 5/170, SASOL) with a mean granulometry equal to 80 µm, with a surface area of 165 m²/g and with a pore volume, measured using the nitrogen adsorption isotherm, of 0.4 mL/g.

After a first dry impregnation, the solid was dried in a flushed bed at 120° C. for 3 h in air, then calcined at 400° C. for 4 h in a flushed bed in a stream of air. The intermediate catalyst contained approximately 6% by weight of Co. It underwent a second dry impregnation step using a cobalt nitrate solution. The solid obtained was dried in a flushed bed at 120° C. for 3 h in air, then calcined at 400° C. for 4 h in a flushed bed in a stream of air. The final catalyst A was obtained which contained 10.5% by weight of Co (in the form of the oxide, $Co_3O_4$).

Example 2 (Comparative): Catalyst B with Formula $Co/Al_2O_3.SiO_2$

A catalyst B comprising cobalt deposited on a silica-alumina support was prepared by dry impregnation of an aqueous solution of cobalt nitrate so as to deposit, in one step, approximately 10% by weight of Co onto a silica-alumina initially containing 5% by weight of $SiO_2$ and with a specific surface area of 180 m²/g and a pore volume of 0.8 mL/g After dry impregnation, the solid was dried in a flushed bed at 120° C. for 3 h in air, then calcined at 400° C. for 4 h in a flushed bed. The final catalyst B was obtained which contained 9.9% by weight of Co (in the form of the oxide, $Co_3O_4$).

Example 3 (Comparative): Catalyst C with Formula $Co/CoAl_2O_4$—$Al_2O_3.SiO_2$

A catalyst C comprising cobalt deposited on a support, based on a mixed oxide phase (in the form of spinel) included in a silica-alumina, was prepared by dry impregnation of an aqueous solution of cobalt nitrate, so as to deposit approximately 10% by weight of cobalt onto the support in one step.

The spinel present in the support for catalyst C was a simple spinel formed by cobalt aluminate, which was included in a silica-alumina containing 5% by weight of $SiO_2$, and had a specific surface area of 180 m²/g and a pore volume of 0.8 mL/g. The spinel included in the silica-alumina was prepared by dry impregnation of an aqueous solution of cobalt nitrate in a manner such as to introduce 5% by weight of Co into said silica-alumina. After drying at 120° C. for 3 hours, the solid was calcined at 850° C. for 4 hours in air. The support for the catalyst, denoted C', was formed by 5% by weight of cobalt in the form of cobalt aluminate (i.e. 15% by weight of spinel) in silica-alumina.

The active phase based on cobalt was then deposited onto said support in one step, by dry impregnation, in accordance with a protocol identical to that described for the preparation of catalyst B. The steps of calcining and drying were also carried out under the operating conditions described for Example 2. The concentration of cobalt in the cobalt nitrate solution used for the successive impregnations was selected in order to obtain the catalyst C with the desired final Co content.

The final catalyst C had a total cobalt content of 15.7% by weight (the Co content present in the spinel phase being included) and a cobalt content in the form of the oxide, $Co_3O_4$, of 10.7% by weight.

Example 4 (Comparative): Catalyst D with Formula $Co/CoAl_2O_4$—$Al_2O_3.SiO_2$ Containing Acetic Acid A catalyst D comprising cobalt and acetic acid deposited on a support, based on a spinel included in a silica-alumina, was prepared by dry impregnation of an aqueous solution of cobalt nitrate then a solution of acetic acid so as to deposit approximately 10% by weight of cobalt onto the support.

The active phase based on cobalt was deposited onto the support C' from Example 3 in one step, by dry impregnation of a solution containing cobalt nitrate After dry impregnation, the solid underwent drying in a flushed bed at 120° C. for 3 h in air.

In a second step, acetic acid was deposited onto the above solid in one step, by dry impregnation of a solution containing acetic acid (Sigma Aldrich®, >99%) at a concentration which could obtain an acetic acid:Co molar ratio on the final catalyst of 0.2. After dry impregnation, the solid underwent a maturation in an atmosphere saturated with water for 9 hours at ambient temperature, then was dried in a flushed bed at 120° C. for 3 h in air, then treated for 4 h in a flushed bed under nitrogen at 400° C.

The final catalyst D had a total cobalt content of 14.6% by weight (the Co content present in the spinel phase being included) and a cobalt content in the form of the oxide, $Co_3O_4$, of 9.6% by weight.

Example 5 (Comparative): Catalyst E with Formula $Co/CoAl_2O_4$—$Al_2O_3.SiO_2$ Containing Citric Acid A catalyst E comprising cobalt and citric acid deposited on a support, based on a spinel included in a silica-alumina, was prepared by dry impregnation of an aqueous solution of cobalt nitrate, then of an aqueous citric acid solution, so as to deposit approximately 10% by weight of cobalt onto the support.

The active phase based on cobalt was deposited onto the support C' from Example 3 in one step, by dry impregnation of a solution containing cobalt nitrate. After dry impregnation, the solid underwent drying in a flushed bed at 120° C. for 3 h in air.

In a second step, citric acid was deposited onto the above solid in one step, by dry impregnation of a solution containing citric acid (Sigma Aldrich®, >99%) at a concentration which could obtain a citric acid:Co molar ratio on the final catalyst of 0.5. After dry impregnation, the solid underwent a maturation in an atmosphere saturated with water for 9 hours at ambient temperature, then was dried in a flushed bed at 120° C. for 3 h in air, then treated for 4 h in a flushed bed under nitrogen at 400° C.

The final catalyst E had a total cobalt content of 14.0% by weight (the Co content present in the spinel phase being included) and a cobalt content in the form of the oxide, $Co_3O_4$, of 9.0% by weight.

Example 6 (in Accordance with the Invention): Catalyst F with Formula $Co/CoAl_2O_4$—$Al_2O_3.SiO_2$ Containing Malonic Acid A catalyst F comprising cobalt and malonic acid deposited on a support, based on a spinel included in a silica-alumina, was prepared by dry impregnation of an aqueous solution of cobalt nitrate, then of an ethanolic malonic acid solution, so as to deposit approximately 10% by weight of cobalt onto the support.

The active phase based on cobalt was deposited onto the support C' from Example 3 in one step, by dry impregnation of a solution containing cobalt nitrate. After dry impregnation, the solid underwent drying in a flushed bed at 120° C. for 3 h in air.

In a second step, malonic acid was deposited onto the above solid in one step, by dry impregnation of an ethanolic solution containing malonic acid (Sigma Aldrich®, >98%) at a concentration which could obtain a malonic acid:Co molar ratio on the final catalyst of 0.2. After dry impregnation, the solid underwent a maturation in an atmosphere saturated with water for 9 hours at ambient temperature, then was dried in a flushed bed at 120° C. for 3 h in air, then treated for 4 h in a flushed bed under nitrogen at 400° C.

The final catalyst F had a total cobalt content of 15.1% by weight (the Co content present in the spinel phase being included) and a cobalt content in the form of the oxide, $Co_3O_4$, of 10.1% by weight.

Example 7 (in Accordance with the Invention): Catalyst G with Formula $Co/CoAl_2O_4$—$Al_2O_3.SiO_2$ Containing Succinic Acid A catalyst H comprising cobalt and succinic acid deposited on a support, based on a spinel included in a silica-alumina, was prepared by dry impregnation of an aqueous solution of cobalt nitrate, then of an ethanolic succinic acid solution, so as to deposit approximately 10% by weight of cobalt onto the support.

The active phase based on cobalt was deposited onto the support C' from Example 3 in one step, by dry impregnation of a solution containing cobalt nitrate. After dry impregnation, the solid underwent drying in a flushed bed at 120° C. for 3 h in air.

In a second step, succinic acid was deposited onto the above solid in one step, by dry impregnation of an ethanolic solution containing succinic acid (Sigma Aldrich®, >98%) at a concentration which could obtain a succinic acid:Co molar ratio on the final catalyst of 0.2. After dry impregnation, the solid underwent a maturation in an atmosphere saturated with water for 9 hours at ambient temperature, then was dried in a flushed bed at 120° C. for 3 h in air, then treated for 4 h in a flushed bed under nitrogen at 400° C.

The final catalyst G had a total cobalt content of 14.8% by weight (the Co content present in the spinel phase being included) and a cobalt content in the form of the oxide, $Co_3O_4$, of 9.8% by weight.

Example 8 (in Accordance with the Invention): Catalyst H with Formula $Co/CoAl_2O_4$—$Al_2O_3SiO_2$ Containing Succinic Acid Catalyst H was prepared in a manner similar to that for catalyst G, with the exception that it did not undergo heat treatment under nitrogen at 400° C. at the end of the preparation.

Example 9: Catalytic Performances of Catalysts a to H in the Fischer-Tropsch Reaction Before being tested using the Fischer-Tropsch synthesis, the catalysts A, B, C, D, E, F, G and H were reduced in situ at 400° C. in a stream of pure hydrogen for 16 hours. The Fischer-Tropsch synthesis reaction was operated in a fixed bed type tube reactor which was operated continuously.

Each of the catalysts was in the form of a powder with a diameter in the range 40 and 150 microns.

The test conditions were as follows:
temperature=216° C.
total pressure=2 MPa
hourly space velocity (HSV)=4100 NL/$h^{-1}$/$kg_{catalyst}$
$H_2$/CO molar ratio=2/1

The results, expressed in terms of activity (CO conversion, as a %) and selectivity (percentage by weight of $C_8^+$ hydrocarbons over the total of the products formed), are shown in Table 1.

TABLE 1

| Catalytic performances for each catalyst | | |
| --- | --- | --- |
| Catalyst | Conversion of CO at 70 h in reaction stream (%) | $C_8^+$ selectivity at 70 h in reaction stream (% by weight) |
| A (comparative) | 27.5 | 57.1 |
| B (comparative) | 38.1 | 65.9 |
| C (comparative) | 44.7 | 68.0 |
| D (comparative) | 35.3 | 62.0 |
| E (comparative) | 41.3 | 56.1 |
| F (invention) | 51.3 | 70.1 |
| G (invention) | 53.5 | 70.5 |
| H (invention) | 53.2 | 70.6 |

The results shown in Table 1 demonstrate that the catalysts in accordance with the invention are more active and/or more selective than the catalysts known in the prior art.

The invention claimed is:

1. A process for preparing a catalyst containing an active cobalt phase deposited on a support comprising alumina, silica or silica-alumina, said support containing a mixed oxide phase containing cobalt and/or nickel, said process comprising:
    a) bringing a support comprising alumina, silica or silica-alumina into contact with at least one solution containing at least one precursor of cobalt and/or nickel, then drying and calcining at a temperature in the range 700° C. to 1200° C., in a manner such as to obtain a mixed oxide phase containing cobalt and/or nickel in the support,
    b) bringing said support containing said mixed oxide phase into contact with at least one solution containing at least one precursor of cobalt,
    c) bringing said support containing said mixed oxide phase into contact with at least one dicarboxylic acid comprising at least three carbon atoms,
    wherein b) and c) are carried out separately, in any order, or simultaneously, to form the catalyst, and
    d) then drying the catalyst at a temperature of less than 200° C.

2. The process as claimed in claim 1, wherein the mixed oxide phase content in the support is in the range 0.1% to 50% by weight with respect to the weight of the support.

3. The process as claimed in claim 1, wherein said support is based on alumina or silica-alumina and the mixed oxide phase comprises an aluminate of formula $CoAl_2O_4$ or formula $NiAl_2O_4$.

4. The process as claimed in claim 1, wherein said support is based on silica or silica-alumina and the mixed oxide phase comprises a silicate of formula $Co_2SiO_4$ or formula $Ni_2SiO_4$.

5. The process as claimed in claim 1, wherein said support is based on silica-alumina and the silica content of said support is in the range 0.5% by weight to 30% by weight with respect to the weight of the support prior to the formation of the mixed oxide phase.

6. The process as claimed in claim 1, wherein the dicarboxylic acid comprising at least three carbon atoms introduced during c) is an aliphatic dicarboxylic acid or aromatic dicarboxylic acid.

7. The process as claimed in claim 6, wherein the dicarboxylic acid comprising at least three carbon atoms is malonic acid or succinic acid.

8. The process as claimed in claim 1, wherein the molar ratio of the dicarboxylic acid comprising at least three carbon atoms introduced during c) with respect to the elemental cobalt introduced in b) is in the range 0.01 to 2.0 mol/mol.

9. The process as claimed in claim 1, wherein the elemental cobalt content introduced as the active phase during b) is in the range 2% to 40% by weight, expressed as metallic elemental cobalt with respect to the total weight of the catalyst.

10. The process as claimed in claim 1, wherein the catalyst further comprises an element selected from the groups VIIIB, IA, IB, IIA, IIB, IIIA, IIIB and VA, wherein said element is either initially present on the support before preparation of the catalyst, or is introduced into the catalyst at any moment during the preparation.

11. The process as claimed in claim 1, wherein the catalyst further contains an organic compound other than the dicarboxylic acid comprising at least three carbon atoms, said organic compound containing oxygen and/or nitrogen, wherein said organic compound is either initially present on the support before preparation of the catalyst, or is introduced into the catalyst at any moment during the preparation.

12. The process as claimed in claim 11, wherein the organic compound is selected from a compound comprising one or more chemical functions selected from a carboxylic, alcohol, ether, aldehyde, ketone, ester, carbonate, amine, nitrile, imide, oxime, urea and amide function.

13. The process as claimed in claim 1, wherein, after d), a calcining e) is carried out at a temperature in the range 200° C. to 550° C., in an inert atmosphere or in an atmosphere containing oxygen.

14. The process as claimed in claim 13, wherein the catalyst obtained from m the calcining e) is reduced at a temperature in the range 200° C. to 500° C.

15. The process as claimed in claim 1, wherein the catalyst obtained from d) is reduced at a temperature in the range 200° C. to 500° C.

16. The process as claimed in claim 1, wherein the dicarboxylic acid is an aliphatic dicarboxylic acid.

17. The process as claimed in claim 1, wherein the dicarboxylic acid is an aromatic dicarboxylic acid.

18. The process as claimed in claim 1, wherein the precursor of cobalt is in the form of a nitrate, carbonate, acetate, chloride, or a complex formed with acetylacetonates, and the precursor of nickel is in the form of a nitrate, carbonate, acetate, chloride, hydroxide, hydroxycarbonate, oxalate, or a complex formed with acetylacetonates.

19. The process as claimed in claim 1, wherein the total content of cobalt and/or nickel is advantageously in the range 1% to 20% by weight with respect to the weight of the final support.

\* \* \* \* \*